(12) United States Patent
Haynes et al.

(10) Patent No.: US 8,931,068 B2
(45) Date of Patent: Jan. 6, 2015

(54) AUTHENTICATION PROCESS

(71) Applicant: Verizon Patent and Licensing Inc., Basking Ridge, NJ (US)

(72) Inventors: Thomas W. Haynes, San Ramon, CA (US); William C. King, Lafayette, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 157 days.

(21) Appl. No.: 13/657,018

(22) Filed: Oct. 22, 2012

(65) Prior Publication Data
US 2014/0115673 A1    Apr. 24, 2014

(51) Int. Cl.
*H04L 29/00*    (2006.01)

(52) U.S. Cl.
USPC .................................. 726/5; 713/186; 380/44

(58) Field of Classification Search
USPC .................. 726/5; 713/186; 380/44
See application file for complete search history.

(56) References Cited

U.S. PATENT DOCUMENTS

| | | | |
|---|---|---|---|
| 2002/0130764 A1* | 9/2002 | Hayakawa | 340/5.82 |
| 2003/0105981 A1* | 6/2003 | Miller et al. | 713/202 |
| 2006/0277412 A1* | 12/2006 | Mandke | 713/186 |
| 2006/0282680 A1* | 12/2006 | Kuhlman et al. | 713/186 |
| 2007/0136792 A1* | 6/2007 | Ting et al. | 726/5 |
| 2009/0292927 A1* | 11/2009 | Wenzel et al. | 713/185 |
| 2012/0023556 A1* | 1/2012 | Schultz et al. | 726/4 |
| 2012/0072979 A1* | 3/2012 | Cha et al. | 726/7 |
| 2012/0257797 A1* | 10/2012 | Leyvand et al. | 382/118 |
| 2013/0152208 A1* | 6/2013 | King et al. | 726/26 |
| 2014/0068702 A1* | 3/2014 | Hyndman et al. | 726/1 |

* cited by examiner

*Primary Examiner* — Michael Pyzocha (57) ABSTRACT

A first network device is configured to receive a request for content from a user device, determine that the user device is not authenticated, and send information to the user device that the user device requires authentication. The first network device is configured further to receive authentication information for the user device from a second network device. The first network device is configured further to generate a secret key, authenticate the user device. The first network device is configured further to request user knowledge information from the user device, validate the user knowledge information and send the content to the user device.

20 Claims, 9 Drawing Sheets

AUTHENTICATION PROCESS

BACKGROUND

The generic bootstrapping architecture (hereinafter referred to as "GBA") authentication procedure permits the authentication of user devices (e.g., wireless devices) within a Third Generation Partnership Project (3GPP) cellular network environment. The authentication may include the creation of secret keys that are used to authenticate a user device with other network devices within the cellular network environment.

DETAILED DESCRIPTION OF PREFERRED EMBODIMENTS

The following detailed description refers to the accompanying drawings. The same reference numbers in different drawings may identify the same or similar elements.

Systems and/or methods described herein may authenticate a user and/or a user device by using one or more authentication processes. The authentication processes may include authenticating the user device, authenticating information known by the user of the user device, and/or authenticating the user. Some, or all, of the authentication processes may be associated with a trusted execution environment in the user device and/or a universal integrated circuit card (UICC) in the user device. For example, a user device may be requesting information (e.g., financial information) from a content provider. The user device may be authenticated as a valid user device to receive the information. Additionally, or alternatively, the user of the user device may be requested to provide user name and password information. Additionally, or alternatively, the user of the user device may be requested to provide information about themselves, such as biometric information (e.g., a finger print, a retina scan, etc.). Once the user, the user's personal knowledge, and/or the user device are authenticated, the user device may receive the information from the content provider.

While the following description focuses on the 3GPP Long Term Evolution (LTE) standard, it will be appreciated that systems and/or methods, described herein, are equally applicable to other wireless standards, such as a wireless fidelity ("WiFi") standard, worldwide interoperability for microwave access ("WiMAX"), global system for mobile communications ("GSM"), or any other wireless standard.

Figure 1A:
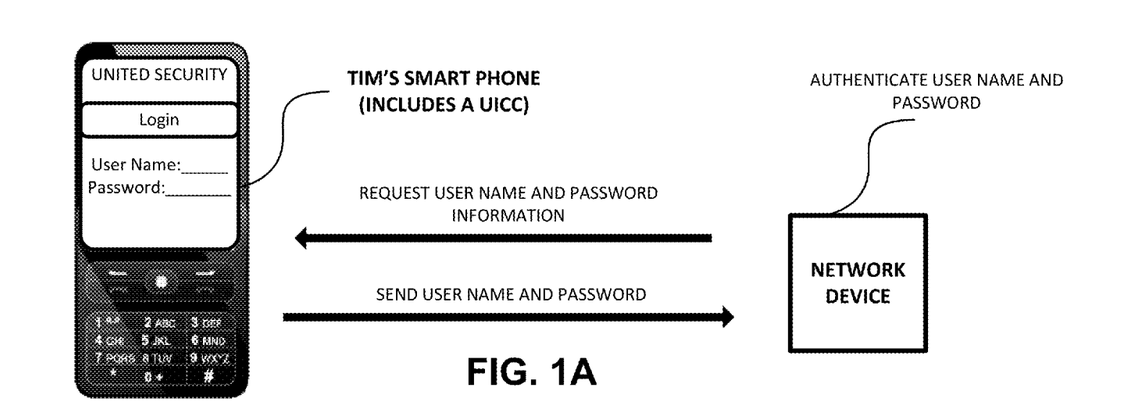
FIGS. 1A-1C is a diagram of an overview of an implementation described herein.
Figure 1B:
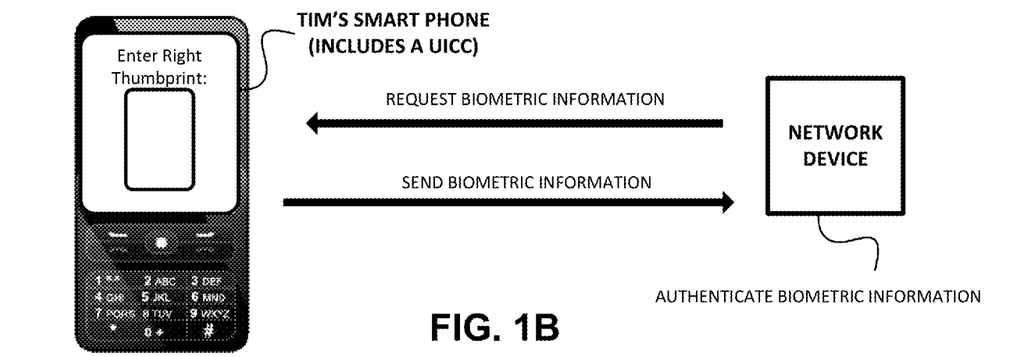
Figure 1C:
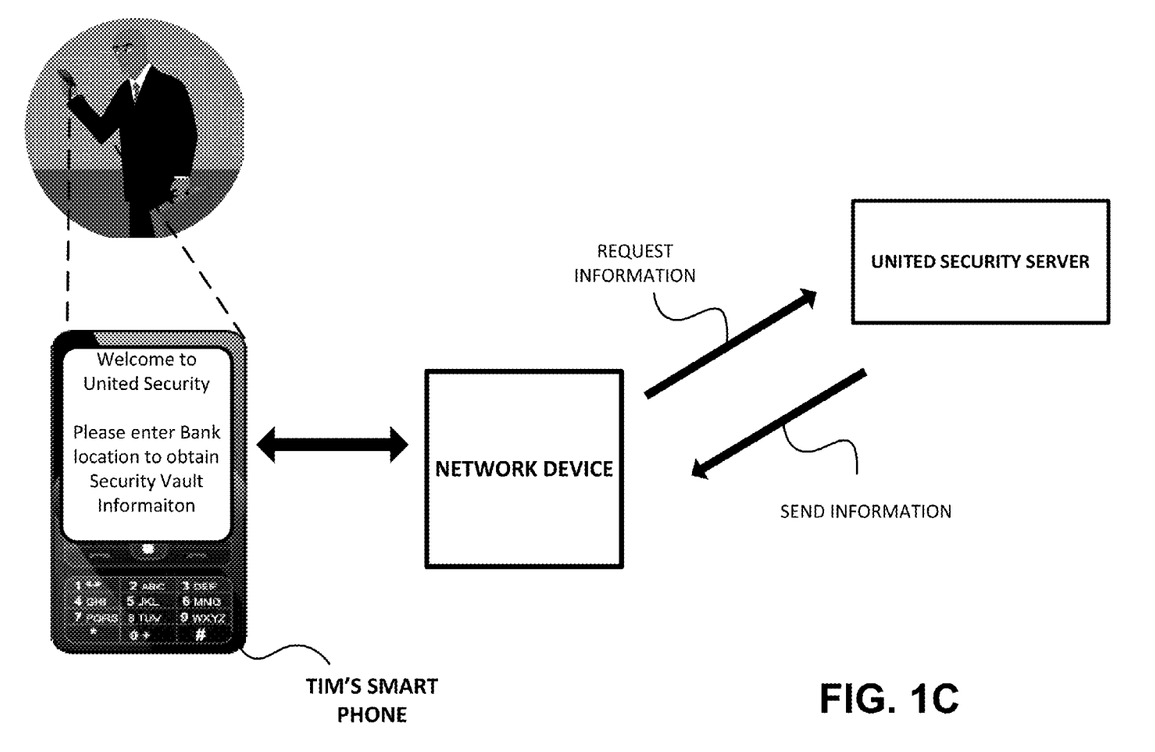

FIGS. 1A-1C are diagrams of an overview of an implementation described herein. FIGS. 1A-1B show Tim's smart phone and a network device. FIG. 1C shows Tim's smart phone, the network device, and a United Security server.

Assume that Tim would like to use his smart phone to receive information from United Security. United Security manufactures and services bank vaults. Tim is an employee of United Security. Assume that Tim' smart phone has been authenticated by the network. Assume that the authentication process being initiated by the network is based on instructions (from United Security) stored by the network device. Assume that the authentication of Tim's smart phone required receiving authentication information from a UICC in Tim's smart phone. Further, assume that based upon Tim's smart phone being authenticated by the network, the network device (as shown in FIG. 1A) requests user name and password information. Tim may view the request on his smart phone and may enter a user name and password. Tim's smart phone may send the user name and password information to the network device for authentication. The user name and password information may be sent from Tim's smart phone to the network device. The network device may receive the user name and password information and may authenticate the information as being valid.

As shown in FIG. 1B, the network device may also request biometric information. The network device may send a request for biometric information to Tim's smart phone. Tim's smart phone may receive the request and display the request to Tim. Tim may view a request to enter his right thumbprint into the boxed area on the smart phone display. Tim enters his thumbprint information and the thumbprint information is sent from Tim's smart phone to the network device. The network device may authenticate the biometric information.

As shown in FIG. 1C, Tim's smart phone requests information from United Security. The information request is sent to the network device. Since Tim and Tim's smart phone have been authenticated, the network device determines that Tim and Tim's smart phone are authorized to receive information from United Security. The network device may send a request for information to United Security. The request may include a message that information about Tim and Tim's smart phone have been validated and that Tim's smart phone is authorized to receive information from United Security. United Security may receive the request and may send the information to Tim's smart phone via the network device.

As a result, one or more authentication processes may be used to authenticate a user and/or a user device. This may provide a greater level of security by using different authentication processes.

Figure 2:
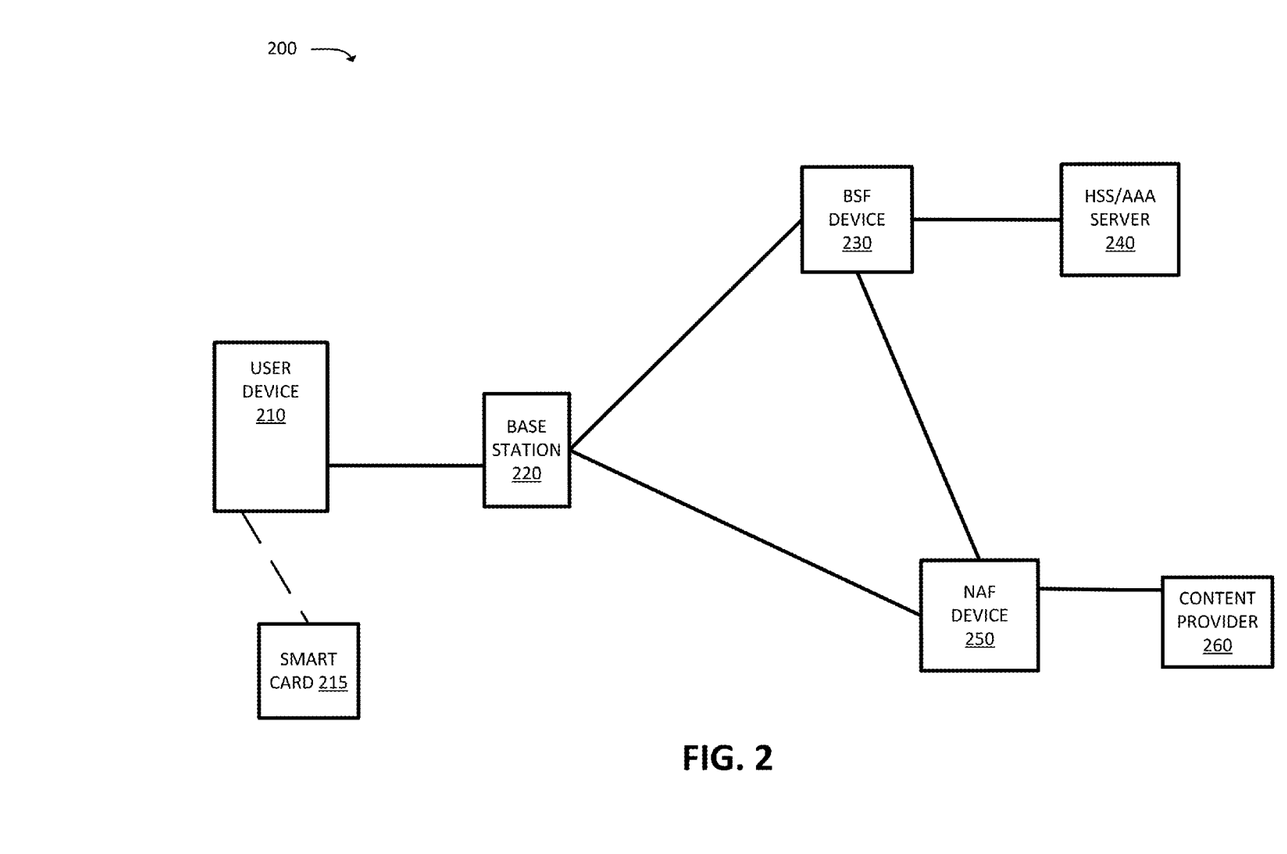
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a smart card 21, a base station 220, a bootstrapping server function device 230 (hereinafter referred to as "BSF device 230"), a home subscriber server (HSS)/authentication, authorization, accounting (AAA) server 240 (hereinafter referred to as "HSS/AAA server 240"), a network application function service device 250 (hereinafter referred to as "NAF device 250"), and content provider 260.

Devices of environment 200 may interconnect via wired connections, wireless connections, or a combination of wired and wireless connections by using one or more of the following types of networks: a cellular network, a public land mobile network (PLMN), a second generation (2G) network, a third generation (3G) network, a fourth generation (4G) network, a fifth generation (5G) network, a local area network (LAN), a wide area network (WAN), a metropolitan network (MAN), a LTE network, a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

User device 210 may include a mobile communication device, such as a wireless mobile communication device that is capable of communicating with a network (e.g., a LTE network). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a computer, a laptop, a tablet computer, a camera, a personal gaming system, a television, or another mobile communication device.

User device 210 may include a trusted execution environment. A trusted execution environment may be a secure area in a processor a memory within user device 210. The trusted execution environment may be used to store, process, and protect information associated with BSF device 230, NAF device 250, and/or content provider 260.

User device 210 may include a variety of applications, such as, for example, an e-mail application, a biometric application, a telephone application, a camera application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Smart card 215 may correspond to a UICC or another type of smart card. Smart card 215 may include an integrated circuit and may facilitate the connection of user device 210 to a network, such as a LTE network. Smart card 215 may include one or more subscriber identity modules (SIMs). Smart card 215 may request data from network devices and perform calculations, based on the requested data, to authenticate user device 210. Smart card 215 may receive information relating to secret keys used in the process of decrypting incoming content from NAF device 250.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to BSF device 230 and NAF device 250. Base station 220 may send traffic to and/or receive traffic from user device 210 via an air interface. One or more of base stations 220 may be associated with a radio area network (RAN), such as a LTE network.

BSF device 230 may include one or more network devices that may provide application independent functions for mutual authentication of mobile devices (e.g., user device 210) and application devices (e.g., NAF device 250) to each other and for bootstrapping the exchange of secret session keys afterwards. The bootstrap procedure may be initiated, for example, during initial power-up of user device 210 or in response to a message from a device (e.g., NAF device 250) instructing user device 210 to begin a bootstrap procedure. In some implementations, BSF device 230 and NAF device 250 may be separate devices. In some other implementations, BSF device 230 and NAF device 250 may be implemented within the same device.

HSS/AAA server 240 may include one or more network devices that may manage, authenticate, update, and/or store, in a memory associated with HSS/AAA server 240, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. HSS/AAA server 240 may store information associated with a smart card (e.g., smart card 215). In some implementations, HSS/AAA server 240 may interact with BSF device 230. Additionally, or alternatively, HSS/AAA server 240 may include a device that performs authentication, authorization, and/or accounting (AAA) operations associated with a communication session with user device 210.

NAF device 250 may include one or more network devices that may permit user device 210 to access content (from content provider 260), based on authentication information received from HSS/AAA server 240 and/or BSF device 230. NAF device 250 may interact with BSF device 230 to initiate authentication functions of user device 210. Additionally, or alternatively, NAF device 250 may interact with user device 210 to receive authentication information. NAF device 250 may provide service announcements to user device 210 that include information (e.g., multicast service identifier, time of transmission, description of content, etc.) that may allow user device 210 to receive content and/or services from content provider 260.

Content provider 260 may include one or more server devices that gather, process, and/or provide information in a manner described herein. For example, content provider 260 may send, via NAF device 250, content to user device 210. In some implementations, content provider 260 and NAF device 250 may be separate devices. In some other implementations, content provider 260 and NAF device 250 may be implemented within the same device.

The term content is intended to be broadly interpreted to include any computer readable data that may be transferred over a network. Content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream).

The quantity of devices and/or networks, illustrated in FIG. 2 is provided for explanatory purposes only. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200.

Figure 3:
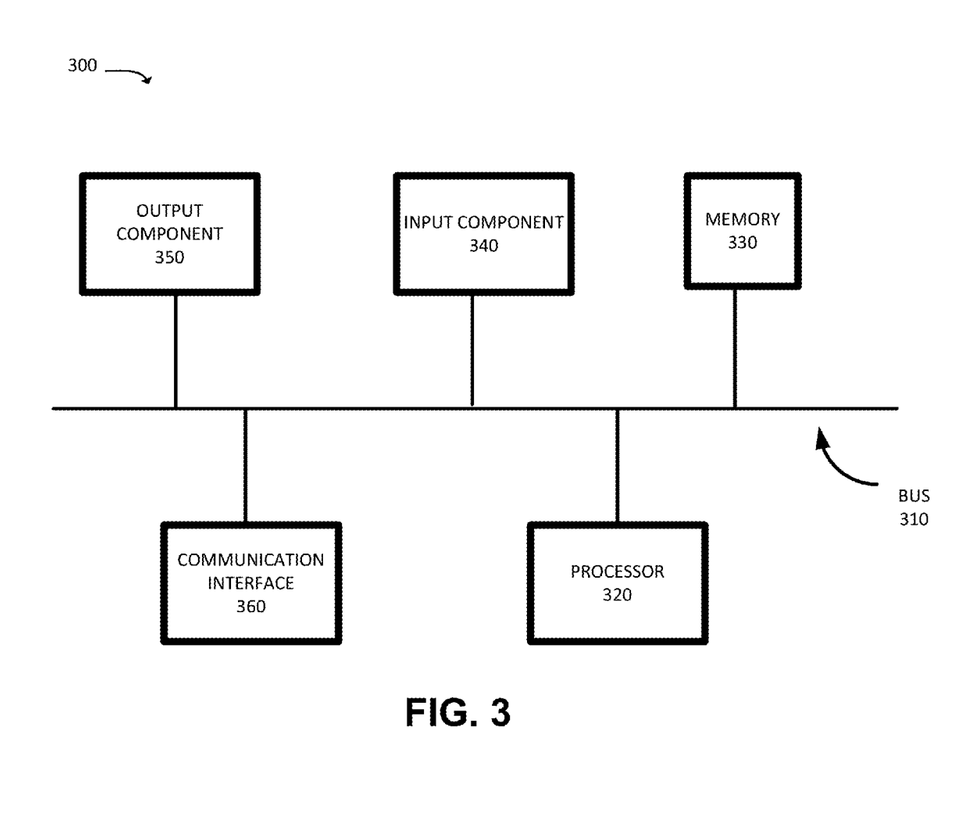
FIG. 3 is a diagram of example components of one or more devices of FIGS. 1 and 2.

FIG. 3 is a diagram of example components of a device 300. Device 300 may correspond to user device 210, smart card 215, base station 220, BSF device 230, HSS/AAA server 240, NAF device 250, and/or content provider 260. Additionally, or alternatively, each of user device 210, smart card 215, base station 220, BSF device 230, HSS/AAA server 240, NAF device 250, and/or content provider 260 may include one or more devices 300 and/or one or more components of device 300.

As shown in FIG. 3, device 300 may include a bus 310, a processor 320, a memory 330, an input component 340, an output component 350, and a communication interface 360.

Bus 310 may include a path that permits communication among the components of device 300. Processor 320 may include one or more processors, microprocessors, or processing logic (e.g., a field programmable gate array (FPGA), or an application specific integrated circuit (ASIC)) that interpret and execute instructions. Memory 330 may include any type of dynamic storage device that stores information and instructions, for execution by processor 320, and/or any type of non-volatile storage device that stores information for use by processor 320.

Input component 340 may include a component that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include any transceiver-like mechanism that enables device 300 to communicate with other devices and/or systems. For example, communication interface 360 may include an Ethernet interface, an optical interface, a coaxial interface, a wireless interface, or the like.

In another implementation, communication interface 360 may include, for example, a transmitter that may convert baseband signals from processor 320 to radio frequency (RF) signals and/or a receiver that may convert RF signals to baseband signals. Alternatively, communication interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications. Communication interface 360 may connect to an antenna assembly (not shown in FIG. 3) for transmission and/or reception of the RF signals.

The antenna assembly may include one or more antennas to transmit and/or receive RF signals over the air. The antenna assembly may, for example, receive RF signals from communication interface 360 and transmit the RF signals over the air, and receive RF signals over the air and provide the RF signals to communication interface 360. In one implementation, for example, communication interface 360 may communicate with a network (described with regard to FIG. 2) and/or devices connected to a network (described with regard to FIG. 2).

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical storage device or spread across multiple physical storage devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

While FIG. 3 shows device 300 as having a particular quantity and arrangement of components, in other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Figure 4:
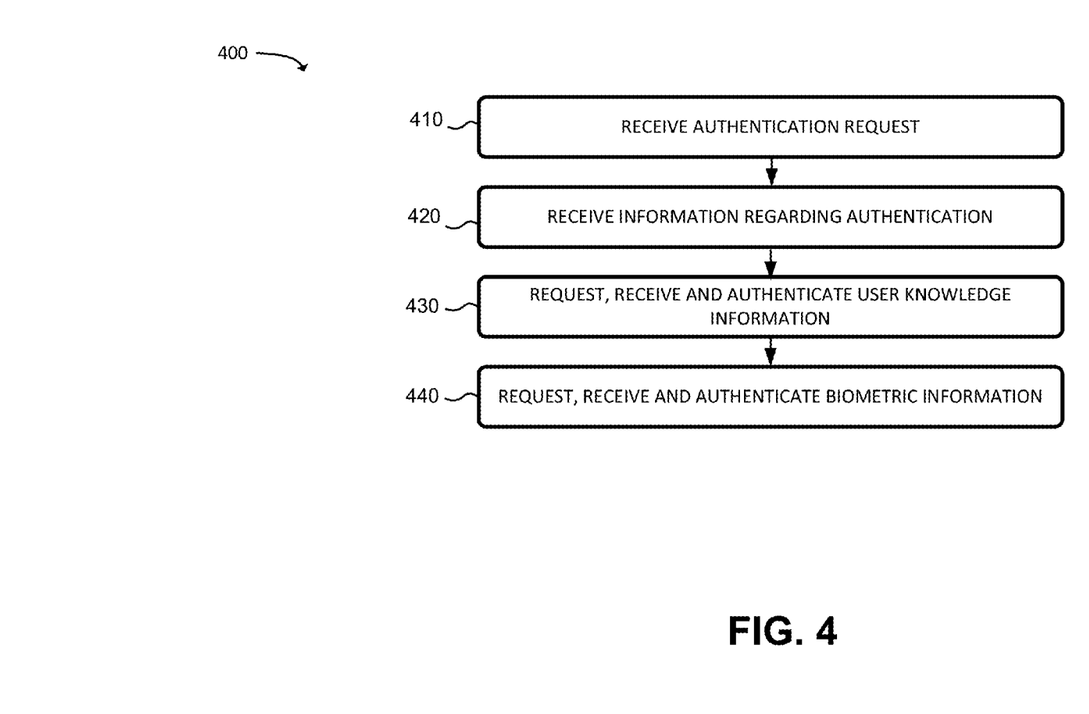
FIG. 4 is a flow chart of an example process for authentication of a user and/or a user device.

FIG. 4 is a flow chart of an example process for authentication of a user and/or a user device. In one example implementation, process 400 may be performed by NAF device 250. In another example implementation, one or more blocks of process 400 may be performed by one or more other devices, such as BSF device 230 or user device 210. Assume that the authentication requirements stored by NAF device 250 and/or BSF device 230 are based on instructions (e.g., whether to use smart card 215 or a trusted execution environment in user device 210, whether to user a GBA key, RSA token, whether to use biometric information, etc.) from content provider 260. Further, NAF device 250 and/or BSF device 230 may have different authentication instructions stored from different content providers 260 (e.g., a bank may require a GBA key and a video conferencing application may not require biometric information).

Process 400 may include receiving an authentication request (block 410). NAF device 250 may receive an authentication request from user device 210. User device 210 may be requesting authentication so that user device 210 may receive content from content provider 260 via NAF device 250.

In one example implementation, NAF device 250 may send a message to user device 210 that user device 210 enter a verification code that is associated with user device 210. For example, the verification code may be associated with another device, such as a RSA token. The verification code may be random numbers or letters that are associated with user device 210. The user may enter the verification code into user device 210. User device 210 may send the verification code to a network device (e.g., BSF device 230 or another network device) to authenticate the verification code. The verification code may be validated by comparing the verification code with stored information by BSF device 230 or another network device. The verification code may be authenticated and a message may be sent (from BSF device 230 or another network device) to user device 210 that user device 210 is authenticated.

In another example implementation, NAF device 250 may send a message to user device 210 that user device 210 is to be authenticated before content may be sent to user device 210. User device 210 may receive the message from NAF device 250. User device 210 may send the authentication request to BSF device 230 so that user device 210 may be validated to receive content from content provider 260.

BSF device 230 may use the GBA authentication procedure to authenticate user device 210. In the GBA authentication procedure, BSF 230 may send a message to HSS/AAA server 240. The message may include a request to determine whether user device 210 is permitted to use a LTE network and/or whether user device 210 is permitted to access content from content provider 260.

HSS/AAA server 240 may receive the message. HSS/AAA server 240 may determine that user device 210 is an authorized user device. HSS/AAA server 240 may authenticate user device 210 by, for example, determining that user device 210 is authorized to use the LTE network. HSS/AAA server 240 may send a message to BSF device 230 that user device 210 is authenticated. If HSS/AAA server 240 does not authenticate user device 210, then HSS/AAA server 240 may send a message to BSF device 230. BSF device 230 may send a message to user device 210 that user device 210 is not authorized to receive the content and/or information from content provider 260.

Additionally, or alternatively, the message from BSF device 230 may include a request to determine whether the user account for accessing content from content provider 260 is valid. HSS/AAA server 240 may determine that the user account is valid by, for example, accessing profile information (stored by HSS/AAA server 240) associated with user device 210 that identifies that the user account is valid, and send a message to BSF device 230 that the user account is valid.

BSF device 230 may send a message to user device 210 that user device 210 is authenticated. User device 210 may receive the message.

With user device 210 authenticated, BSF device 230 may create a BSF transaction identifier ("hereinafter referred to as "B-TID"). The B-TID is an identifier used to define the session during which user device 210 is validated by the network. BSF device 230 may store the B-TID and may send the B-TID to user device 210. B-TID may be valid for a limited amount of time. For example, the B-TID may be valid for a 24 hour interval of time. Alternatively, the B-TID may be valid as long as a session is valid, or the B-TID may be valid for a time period greater than the time associated with a session. Additionally, or alternatively, the B-TID may be valid for a particular coverage area, and/or for a particular session. During this interval of time, user device 210 may receive content from content provider 260 via NAF device 250.

Additionally, BSF device 230 may generate a cipher key (hereinafter referred to as "Ck") and an integrity key (hereinafter referred to as "Ik"). The Ck is associated with protecting and providing signal data integrity between new devices. The Ik is associated with providing authentication of a device (e.g., user device 210 or NAF device 250). The Ck and the Ik may be stored by BSF device 230 and sent to smart card 215 in user device 210 or the Ck and the Ik may be sent to a trusted execution environment in user device 210. Smart card 215 (or the trusted execution environment in user device 210) may use a key derivation function to generate a GBA key by using the Ck and the Ik. Additionally, user device 210 may use other factors to generate the GBA key, such as the B-TID, an international mobile subscriber identifier (hereinafter referred to as "IMSI"), GUSS (GBA user security settings), a mobile subscriber integrated services digital network (hereinafter referred to as "MSISDN"), an integrated circuit card identifier (hereinafter referred to as "ICCID"), an application identifier (e.g., an identifier identifying the type of application that requires the GBA key, such as an application providing video content to user device 210), an enterprise name (e.g., an organization, such as a specific entity (such as a bank), that uses the GBA key for authentication of user devices 210 requesting information and/or content), and/or a NAF identifier.

In some implementations, the Ck and the Ik are associated with a session (e.g., a LTE session). Once the session expires, the Ck and the Ik are no longer valid. The session may expire based on a user turning off user device 210, user device 210 being powered down, user device 210 moving to a different coverage area, or user device 210 attempting to use different network technology.

Process 400 may include receiving information regarding authentication (block 420). In one example implementation, NAF device 250 may receive a message from a network device (e.g., BSF device 230 or another network device) that user device 210 is valid based on an authentication process (e.g., such as using an RSA token, described with regard to block 410).

In another example implementation, NAF device 250 may receive the Ck and the Ik (in a manner similar to that described with regard to block 410) from BSF device 230. NAF device 250 may use the Ck and the Ik to derive a GBA key (described with regard to block 410). User device 210 and NAF device 250 may authenticate each other by using each other's GBA key. Since both GBA keys are derived using the same Ck and the Ik, the GBA keys may validate each other and allow NAF device 250 to authenticate user device 210.

The GBA key may expire after a period of time (e.g., the GBA key is valid for 24 hours or in response to an event (e.g., a specific sporting event being presented on user device 210 may end)). Once the time expires, NAF device 250 may remove the GBA key from storage. The GBA key, being used by user device 210, may expire and user device 210 may request authentication (based on receiving a message from NAF device 250 that user device 210 is using an expired GBA key to request content) from BSF device 230 to receive a new GBA key.

Process 400 may include requesting, receiving and authenticating user knowledge information (block 430). For example, NAF device 250 may send a request to user device 210 for the user to provide information based on the personal knowledge of the user. For example, the personal knowledge may be a user name and a password, the user's social security information, address information, information regarding the mother's maiden name, and/or other types of information.

User device 210 may receive the request and may display the request to the user of user device 210. The user of user device 210 may view the request and may enter, for example, a user name and password (associated with a request for content and/or information from content provider 260 via NAF device 250). User device 210 may send the user name and password information to NAF device 250.

In one example implementation, user device 210 may send the user knowledge information from an application (associated with content provider 260) stored in a trusted execution environment within user device 210. In another example implementation, user device 210 may send the user name and password information from an application that is associated with sending secure messages by using smart card 215 inside of user device 210.

NAF device 250 may receive the user knowledge information and may validate the information based on valid user name and password information stored by NAF device 250. NAF device 250 may validate that the user knowledge information came from smart card 215, a trusted execution environment within user device 210, and/or user device 210. If NAF device 250 does not validate the user knowledge information, NAF device 250 may send a message to user device 210 (that can be displayed to the user) that the user knowledge information is not valid.

Process 400 may include requesting, receiving, and authenticating biometric information (block 440). For example, NAF device 250 may send a request to user device 210 for biometric information to authenticate the user of user device 210. User device 210 may receive the request and may display the request to the user of user device 210. The user may view the request and may enter biometric information via a biometric reader associated with user device 210. For example, the user may use a retina scanner associated with user device 210 to send retina information to NAF device 250.

Alternatively, the user may use finger print scanner associated with user device 210 to send finger print information to NAF device 250. Alternatively, the user may use any other type of biometric reader to input unique characteristics associated with the user into user device 210.

User device 210 may send the biometric information to NAF device 250. In one example implementation, user device 210 may send the biometric information from an application (associated with content provider 260) stored in a trusted execution environment within user device 210. In another example implementation, user device 210 may send the biometric information from an application that is associated with sending secure messages by using smart card 215 inside of user device 210.

NAF device 250 may receive the biometric information and may validate the information based on valid biometric information stored by NAF device 250. NAF device 250 may validate that the biometric information came from smart card 215, a trusted execution environment within user device 210, and/or user device 210. In one example implementation, NAF device 250 may provide user device 210 with permission to receive content and/or information from content provider 260. NAF device 250 may send a request for content and/or information to content provider 260. The request may include a notification to content provider 260 that user device 210 is authorized (based on biometric, user knowledge and/or other information) to receive content and/or information from content provider 260. In another example implementation, NAF device 250 may request additional authentication requests from the user and/or user device 210.

If NAF device 250 does not validate the biometric information, then NAF device 250 may send a message to user device 210 (that can be displayed to the user) that the biometric information is not valid.

While a series of blocks has been described with regard to FIG. 4, the order of the blocks may be modified in other implementations. Further, non-dependent blocks may be performed in parallel.

Figure 5:
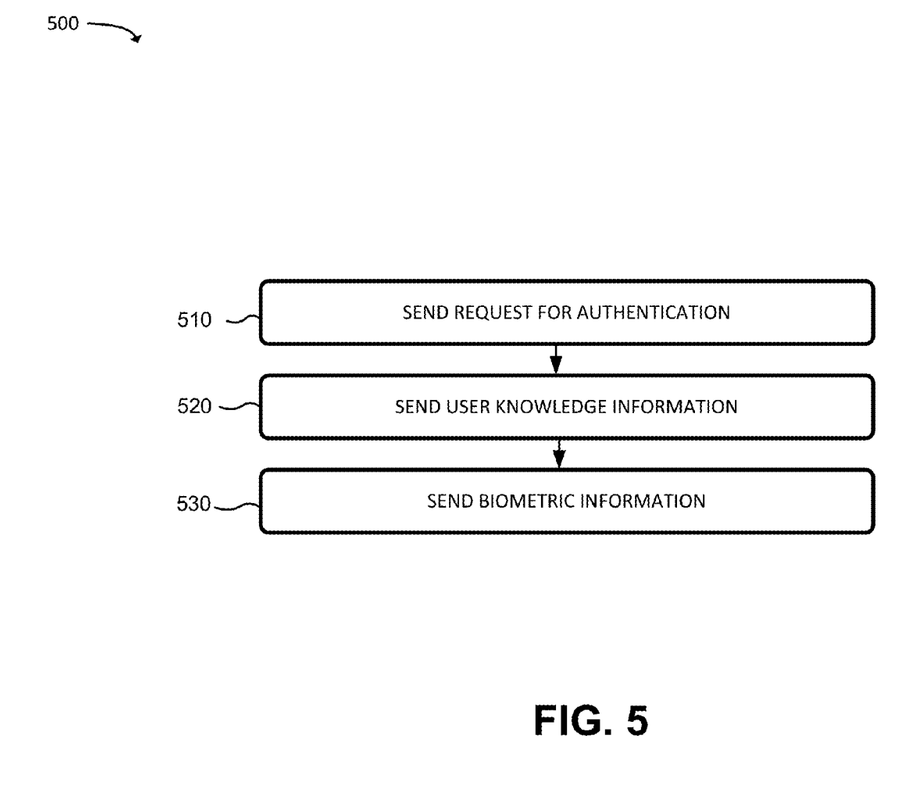
FIG. 5 is a flow chart of an example process for authentication of a user and/or a user device.

FIG. 5 is a flow chart of an example process for receiving authentication of a user and/or a user device. In one example implementation, process 500 may be performed by user device 210. In another example implementation, one or more blocks of process 500 may be performed by one or more other devices, such as BSF device 230 or NAF device 250.

Process 500 may include sending a request for authentication (block 510). For example, a user, of user device 210, may want to receive content and/or information from content provider 260, via NAF device 250. User device 210 may send a message to NAF device 250 requesting the content. NAF device 250 may receive the content and may determine that user device 210 is not authenticated. NAF device 250 may send a message to user device 210 that user device 210 is to be authenticated before any content and/or information from content provider 260 can be sent to user device 210.

In one example implementation, user device 210 may send a verification code to BSF device 230 or another network device, described with regard to block 410 in FIG. 4. The verification code may be validated and a message may be sent to user device 210 that the verification code is validated, described with regard to block 410 in FIG. 4.

In another example implementation, user device 210 may send a request for authentication, described with regard to block 410 in FIG. 4, to BSF device 230. As described in block 410 in FIG. 4, user device 210 may receive the Ck and the Ik from BSF device 210. User device 210 may use smart card 215 to derive a GBA key using the Ck and the Ik or user device 210 may use a trusted execution environment within user device 210 to derive a GBA key using the Ck and the Ik.

Process 500 may include sending user knowledge information (block 520). For example, NAF device 250 may send a message (that may be displayed to the user, via user device 210) to user device 210 requesting user knowledge information from the user. The user, of user device 210, may enter the user knowledge information, described with regard to block 430 in FIG. 4, into user device 210. NAF device 250 may receive the user knowledge information and may validate the user knowledge information, described with regard to block 430 in FIG. 4. In one example implementation, NAF device 250 may provide user device 210 with permission to receive content and/or information from content provider 260. In another example implementation, NAF device 250 may request additional authentication requests from the user and/or user device 210 before permitting user device 210 to receive content from content provider 260.

Process 500 may include sending biometric information (block 530). For example, the user, of user device 210, may want to receive content and/or information from content provider 260, via NAF device 250. NAF device 250 may send a message (that may be displayed to the user, via user device 210) to user device 210 requesting biometric information for the user. The user, of user device 210, may enter biometric information, described with regard to block 440 in FIG. 4. NAF device 250 may receive the biometric information and may validate the biometric information, described with regard to block 440 in FIG. 4.

In one example implementation, NAF device 250 may provide user device 210 with permission to receive content and/or information from content provider 260. In another example implementation, NAF device 250 may request additional authentication requests from the user and/or user device 210 before permitting user device 210 to receive content from content provider 260.

While a series of blocks has been described with regard to FIG. 5, the order of the blocks may be modified in other implementations. Further, non-dependent blocks may be performed in parallel.

Figure 6:
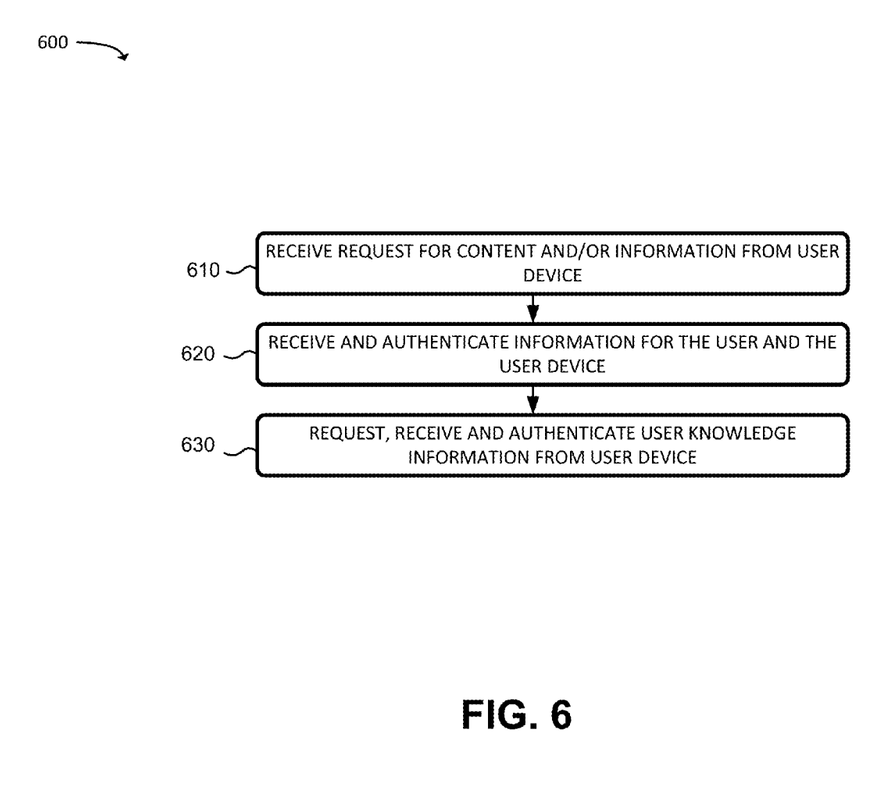
FIG. 6 is a flow chart of an example process for authentication of a user and/or a user device.

FIG. 6 is a flow chart of an example process for authentication of a user and/or a user device. In one example implementation, process 600 may be performed by NAF device 250. In another example implementation, one or more blocks of process 600 may be performed by one or more other devices, such as BSF device 230 or user device 210. Assume that the authentication requirements stored by NAF device 250 and/or BSF device 230 are based on instructions (e.g., whether to use smart card 215 or a trusted execution environment in user device 210, whether to user a GBA key, RSA token, whether to use biometric information, etc.) from content provider 260. Further, NAF device 250 and/or BSF device 230 may have different authentication instructions stored from different content providers 260 (e.g., a bank may require a GBA key and a video conferencing application may not require biometric information).

Process 600 may include receiving a request for content and/or information from a user device. For example, a user, of user device 210, may request to view content (e.g., video content) from content provider 260. The request to view the content may be sent to NAF device 250. NAF device 250 may receive the request and may determine that the user and user device 210 have to be authenticated. NAF device 250 may send a message to user device 210 that the user is to provide biometric information. User device 210 may receive the message. The user may use a biometric reader associated with user device 210 to enter biometric information, such as retina, finger print, or any other type of biometric information that can be analyzed by the biometric reader in user device 210.

The biometric information may be stored in smart card 215 or a trusted execution environment inside user device 210. The biometric information and information that the biometric information is from user device 210 may be sent to BSF device 250. BSF device 250 may receive the information from user device 210. In one example implementation, BSF device 250 may authenticate the biometric information by comparing the biometric information stored by BSF device 250. In another example implementation, BSF device 250 may send the biometric information to another network device (e.g., HSS/AAA server 240) to authenticate the biometric information and send an authentication result back to BSF device 250. In either example implementation, HSS/AAA server 240 may authenticate user device 210, described with regard to block 410 in FIG. 4

With the biometric information and user device 210 authenticated, BSF device 230 may create a B-TID and the Ck and the Ik, described with regard to block 410 in FIG. 4. BSF device 230 may send the B-TID, the Ck and the Ik to smart card 215 or the trusted execution environment in user device 210. User device 210 may use the Ck, the Ik and the B-TID to create a GBA key.

Process 600 may include receiving and authenticating information for the user and the user device (block 620). NAF device 250 may receive the Ck, the Ik and the B-TID from BSF device 230. NAF device 250 may create a GBA key, in a similar manner to the GBA key creation described with regard to FIG. 4. User device 210 and NAF device 250 may authenticate each other by using each other's GBA key. Since both GBA keys are derived using the same Ck and the Ik, the GBA keys may validate each other and allow NAF device 250 to authenticate user device 210.

Process 600 may include requesting, receiving, and authenticating user knowledge information from the user device (block 630). For example, NAF device 250 may request user knowledge information from user device 210, described with regard to block 430 in FIG. 4. NAF device 250 may receive the user knowledge information and may authenticate the user knowledge information, described with regard to block 430 in FIG. 4.

In one example implementation, NAF device 250 may provide user device 210 with permission to receive content and/or information from content provider 260. NAF device 250 may send a request for content and/or information to content provider 260. The request may include a notification to content provider 260 that user device 210 is authorized (based on biometric, user knowledge, and/or other information) to receive content and/or information from content provider 260. In another example implementation, NAF device 250 may request additional authentication requests from the user and/or user device 210.

While a series of blocks has been described with regard to FIG. 6, the order of the blocks may be modified in other implementations. Further, non-dependent blocks may be performed in parallel.

Figure 7A:
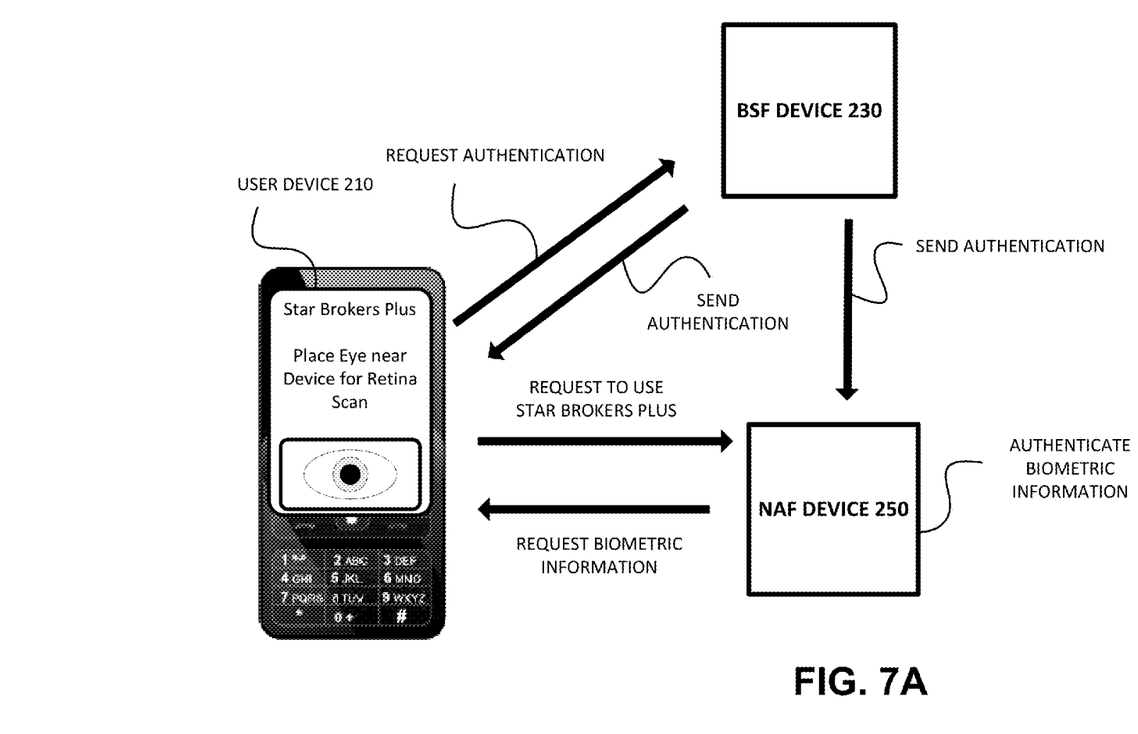
FIGS. 7A-7B are diagrams of example processes for authentication of a user and/or a user device.
Figure 7B:
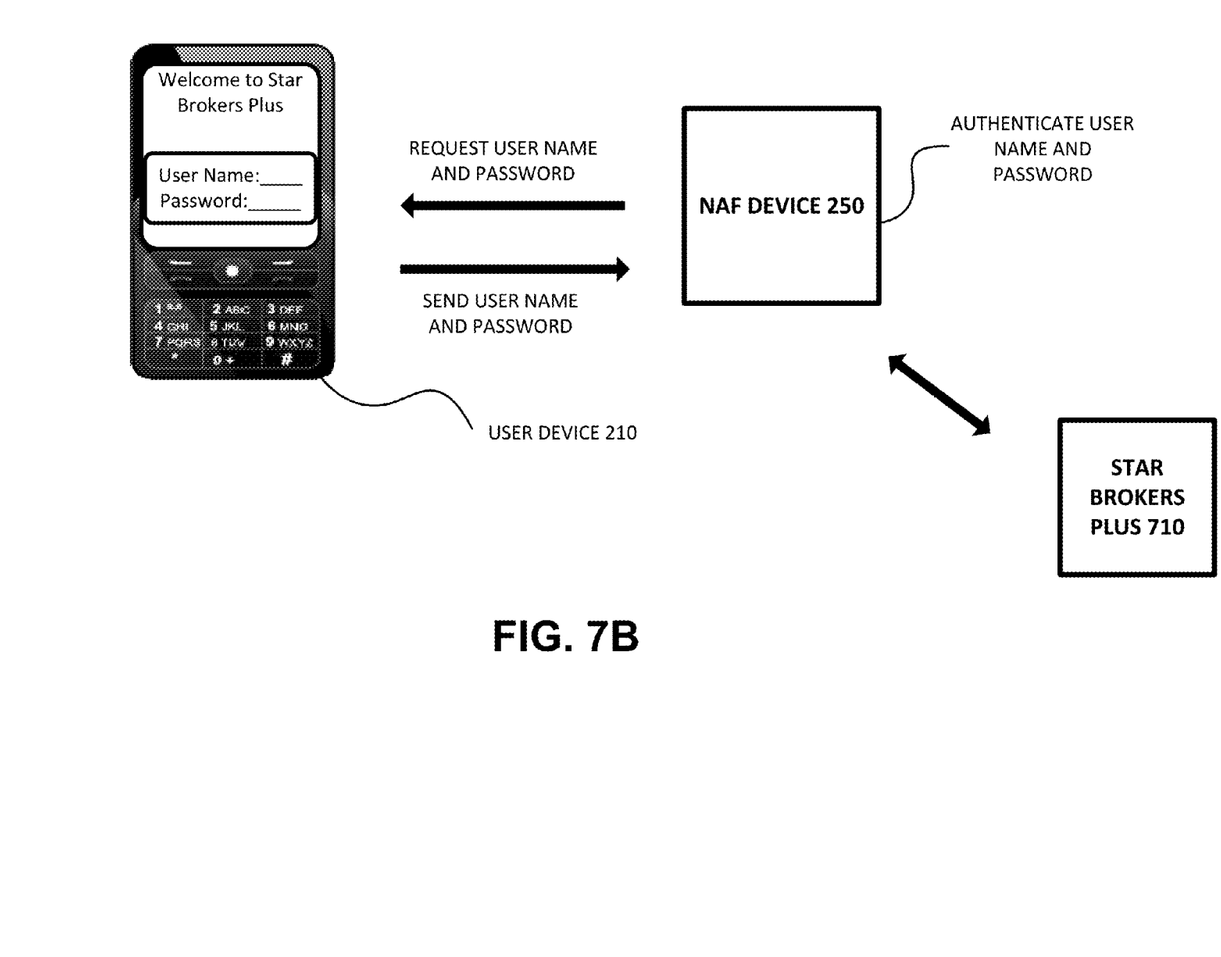

FIGS. 7A-7B are example processes for authentication of a user and/or a user device. FIG. 7A shows user device 210, BSF device 230, and NAF device 250. FIG. 7B shows user device 210, NAF device 250 and Star Brokers Plus 710. Star Brokers Plus 710 may correspond to content provider 260, described with regard to FIG. 2.

A user of user device 210 would like to receive information about their brokerage account from Star Brokers Plus. The user may use an application (on user device 210) associated with Star Brokers Plus to send a request for the brokerage account information to NAF device 250. As shown in FIG. 7A, NAF device 250 may receive the request and may send a message to user device 210. The message may include a request for the user's biometric information. User device 210 may display the request to the user. The user may use a biometric reader that will scan the user's retina and store the information in smart card 215 inside of user device 210. User device 210, via smart card 215, may send the biometric information and information about user device 210 (e.g., a MDN identifier) to BSF device 230. BSF device 230 may receive the authentication request and may authenticate user device 210 in a similar manner to that described with regard to FIG. 6. BSF device 230 may send a message to user device 210 that user device 210 is authenticated and also information associated with a GBA key may be sent (from BSF device 230) to user device 210. Additionally, BSF device 230 may send information associated with a GBA key to NAF device 250. NAF device 250 and user device 210 may use the information (received from BSF device 230) to authenticate each other.

Based on authenticating the user and user device 210, NAF device 250 may send a request to user device 210 for a user name and password, as shown in FIG. 7B, associated with the user's brokerage account at Star Brokers Plus. User device 210 may display the request for the user name and password to the user. The user may enter a user name and password into user device 210. User device 210 may, using the trusted execution environment inside of user device 210, send the user name and password information to NAF device 250. NAF device 250 may authenticate the user name and password. NAF device 250 may send a message to Star Brokers Plus 710 that the user name and password, the user device, and the user are authenticated. Star Brokers Plus 710 may receive the message and may send the information requested by the user to user device 210 via NAF device 250.

Systems and/or methods described herein may authenticate a user and/or a user device by using one or more authentication processes. As a result, this may permit providing a greater level of security by using different authentication processes.

The foregoing description of implementations provides illustration and description, but is not intended to be exhaustive or to limit the implementations to the precise form disclosed. Modifications and variations are possible in light of the above disclosure or may be acquired from practice of the implementations.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
    receiving, by a first network device, a request for content from a user device;
    determining, by the first network device, that the user device is not authenticated based on receiving the request for the content from the user device;
    sending, by the first network device, information to the user device that the user device requires authentication before the user device is permitted to receive the content;
    receiving, by the first network device, a notification from a second network device that the user device is authenticated based on the second network device determining that biometric information, associated with the user device, and user device information are valid;
    generating, by the first network device, a secret key when the notification indicates that the biometric information and the user device information are valid;
    authenticating, by the first network device, the user device by using the secret key generated by the first network device;
    requesting, by the first network device, user knowledge information from the user device based on authenticating the user device;
    receiving, by the first network device, the user knowledge information from the user device based on requesting the user knowledge information;
    validating, by the first network device, the user knowledge information based on receiving the user knowledge information; and
    sending, by the first network device, the content to the user device based on validating the user knowledge information and authenticating the user device.

2. The method of claim 1, where validating that the user knowledge information received from the second network device includes:
    validating that the user knowledge information is from a trusted execution environment in the user device.

3. The method of claim 1, where generating the secret key includes:
    generating the secret key based on a generic bootstrapping user security setting, a cipher key, or an integrity key.

4. The method of claim 1, where generating the secret key includes:
    generating the secret key based on an international mobile subscriber identity, associated with the user device, a generic bootstrapping user security setting, or an application identifier associated with an application associated with a content provider.

5. The method of claim 1, where receiving the user knowledge information from the user device includes:
    receiving the user knowledge information from a universal integrated circuit card located in the user device.

6. The method of claim 1, where receiving the user knowledge information from the user device includes:
    receiving the user knowledge information from a trusted execution environment located in the user device.

7. The method of claim 1, where receiving the notification from the second network device includes:
    receiving information indicating that the second network device authenticated the user device by determining that the user device is using a trusted execution environment.

8. A system comprising:
    a first network device to:
        receive a request for content from a user device;
        determine, based on receiving the request, that the user device is not authenticated;
        send information to the user device that the user device requires authentication before the user device is permitted to receive the content;
        receive authentication information, associated with the user device, from a second network device based on the second network device determining that biometric information, associated with the user device, is valid;
        generate a secret key when the authentication information indicates that the biometric information is valid;
        authenticate the user device by using the secret key generated by the first network device;
        request user knowledge information from the user device based on authenticating the user device;
        receive the user knowledge information from the user device based on the request for the user knowledge information;
        validate the user knowledge information based on receiving the user knowledge information; and
        send the content to the user device based on validating the user knowledge information, and authenticating the user device.

9. The system of claim 8, where, when validating the user knowledge information, the first network device is to:
    validate that the user knowledge information is from a trusted execution environment in the user device.

10. The system of claim 8, where, when authenticating the user device by using the secret key generated by the first network device, the first network device is to:
    receive a second secret key from the user device;
    determine that the second secret key matches the secret key; and
    authenticate the user device by determining that the second secret key matches the secret key.

11. The system of claim 8, where, when receiving the authentication information from the second network device, the first network device is to:
    receive information indicating that the user device is validated based on the second network device determining that the user device is sending and receiving information from a trusted execution environment.

12. The system of claim 8, where, when determining that the user device is not authenticated, the first network device is to:
    determine that the first network device has not validated the user device by using a secret key.

13. The system of claim 8, where, when receiving the authentication information from the second network device, the first network device is to:
    receive information indicating that the user device is validated based on the second network device determining that the user device is sending and receiving information from a universal integrated circuit card.

14. The system of claim 8, where, when receiving the request for the content, the first network device is to:
receive the request for the content associated with a content provider,
the content provider using the first network device to send the content to the user device.

15. The system of claim 8, where, when sending the content to the user device, the first network device is to:
send a notification to a content provider that the user device information, the biometric information, and the user knowledge information are validated;
receive content from the content provider based on receiving the notification; and
send the content to the user device based on receiving the content from the content provider.

16. A non-transitory computer readable medium storing instructions, the instructions comprising:
a plurality of instructions, that when executed by one or more processors of a first network device, cause the one or more processors to:
receive a request for content from a user device;
determine that the user device is not authenticated;
send information to the user device that the user device requires authentication before the user device is permitted to receive the content;
receive a notification from a second network device that the user device is authenticated based on the second network device determining that user device information is valid;
generate a secret key when the notification indicates that the user device information is valid;
authenticate the user device by using the secret key generated by the first network device;
request biometric information from the user device;
receive the biometric information from the user device based on requesting the biometric information from the user device;
validate the biometric information received from the user device;
request user knowledge information from the user device based on validating the biometric information received from the user device;
receive the user knowledge information from the user device based on requesting the user knowledge information from the user device;
validate the user knowledge information based on receiving the user knowledge information from the user device; and
send the content to the user device based on validating the user knowledge information, authenticating the user device, and validating the biometric information.

17. The non-transitory computer-readable medium of claim 16, where one or more instructions, of the plurality of instructions, to receive the biometric information from the user device include one or more instructions to:
receive the biometric information from a trusted execution environment in the user device.

18. The non-transitory computer-readable medium of claim 16, where one or more instructions, of the plurality of instructions, to receive the biometric information from the user device include one or more instructions to:
receive the biometric information from a universal integrated circuit card in the user device.

19. The non-transitory computer-readable medium of claim 16, where one or more instructions, of the plurality of instructions, to receive the biometric information from the user device include one or more instructions to:
validate the biometric information by comparing the biometric information with stored information; or
validate that the biometric information is received from a trusted execution environment in the user device.

20. The non-transitory computer-readable medium of claim 16, where one or more instructions, of the plurality of instructions, to send the content to the user device include one or more instructions to:
send, to a content provider, information indicating that the user device, the biometric information, and the user knowledge information are validated;
receive content from the content provider; and
send the content to the user device based on receiving the content from the content provider.

\* \* \* \* \*